United States Patent
Alapuranen

(10) Patent No.: US 8,958,280 B2
(45) Date of Patent: Feb. 17, 2015

(54) INTERFERENCE REJECTION METHOD BASED ON MULTIPLE SUB-BAND PROJECTIONS

(75) Inventor: Pertti Alapuranen, Deltona, FL (US)

(73) Assignee: XG Technology, Inc., Sarasota, FL (US)

( * ) Notice: Subject to any disclaimer, the term of this patent is extended or adjusted under 35 U.S.C. 154(b) by 173 days.

(21) Appl. No.: 13/478,198

(22) Filed: May 23, 2012

(65) Prior Publication Data

US 2012/0314560 A1 Dec. 13, 2012

Related U.S. Application Data

(60) Provisional application No. 61/494,497, filed on Jun. 8, 2011.

(51) Int. Cl.
*H04B 7/04* (2006.01)
*H04J 11/00* (2006.01)
*H04L 27/26* (2006.01)
*H04B 1/12* (2006.01)
*H04W 16/14* (2009.01)

(52) U.S. Cl.
CPC ............ *H04L 27/2647* (2013.01); *H04B 1/126* (2013.01); *H04W 16/14* (2013.01)
USPC .......................................................... 370/210

(58) Field of Classification Search
USPC .......................................... 375/347; 370/208
See application file for complete search history.

(56) References Cited

U.S. PATENT DOCUMENTS

| | | | | |
|---|---|---|---|---|
| 7,145,971 | B2 * | 12/2006 | Raleigh et al. ................. | 375/347 |
| 8,565,063 | B2 * | 10/2013 | Wang .............................. | 370/208 |
| 2005/0195915 | A1 | 9/2005 | Raleigh et al. | |
| 2010/0067366 | A1 | 3/2010 | Nicoli | |
| 2010/0172427 | A1 | 7/2010 | Kleider et al. | |

\* cited by examiner

*Primary Examiner* — Kevin C Harper
*Assistant Examiner* — Derrick V Rose
(74) *Attorney, Agent, or Firm* — Dennis L. Cook, Esq.

(57) ABSTRACT

This invention describes a cognitive radio signal processing where interference is mitigated using multiple frequency spatial projection to orthogonalize interference. The method is based on the well-known LMS solution of $W=(A^{T}A)^{-1}*d$ that is computed from received multi antenna and multicarrier signals in a novel way.

8 Claims, No Drawings

INTERFERENCE REJECTION METHOD BASED ON MULTIPLE SUB-BAND PROJECTIONS

CROSS-REFERENCE TO RELATED APPLICATION

The present application claims the benefit of previously filed Provisional Patent Application, Ser. No. 61/494,497 filed Jun. 8, 2011.

FIELD OF THE INVENTION

This invention describes a cognitive radio signal processing method where interference is mitigated using multiple frequency domain spatial projections to orthogonalize interference. The method is based on a well-known LMS solution that is applied in a new way that allows for a very high level of performance in modern cognitive radios.

BACKGROUND OF THE INVENTION

Modern cognitive radio technology allows dynamic spectrum sensing, spectrum management, mobility and spectrum sharing, to mention few. Classical cognitive radios change frequency channels when the interference level or other parameters associated with operation can be improved by moving to another frequency. The modern signal processing and multiple antenna technologies, however, allow expanded cognitive operation where receiver algorithms and transmit waveforms are dynamically adjusted for an operational environment.

Radio spectrum is a limited resource. A large amount of spectrum is required to deliver services that are associated with modern wireless personal communications. Typical examples are smart phone Internet applications, wireless streaming audio, and video, to mention a few. These services consume large amounts of spectral resources causing both financial and spectrum policy issues.

Typically these services are provided using licensed spectrum. The financial burden from licensing can be defined as a cost of billions of dollars, even for a relatively small amount of spectrum, when compared to freely available unlicensed spectrum. The licensing, however, is required to make sure that current 1G to 4G radio technologies have the coordinated access they require to deliver quality of service that is adequate for an end user application.

Currently in United States there are several hundred MHz of unlicensed spectrum that can be used for delivering wireless services to consumers, however, traditional radio technologies typically suffer from interference from uncoordinated access from other unlicensed users. A novel radio technology is required that can deliver service while being highly resistant to interference while also creating as little interference as possible to other users in the unlicensed band.

No single signal processing or radio solution provides a complete answer to the problem described, however by combining multiple technologies a cognitive radio network can be engineered. The invention described in this disclosure is one piece of a complete cognitive radio network technology.

BRIEF SUMMARY OF THE INVENTION

The invention disclosed in this application is a method to create a more intelligent cognitive radio receiver that can mitigate interference.

This invention describes a cognitive radio signal processing method where interference is mitigated using multiple frequency domain spatial projections to orthogonalize interference. The method is based on a well-known LMS solution that is applied in a new way that allows for a very high level of performance in modern cognitive radios.

Therefore the objects of this invention include the following:

An interference resistant receiver that uses subspace projection in frequency domain to orthogonalize interference to desired signal. The signal space is spanned by multiple receive signals that are received using individual antennas. The signals are transformed into frequency space using Fourier or Fast Fourier Transform (FFT). Some or all of the complex outputs from the transform are "subcarriers". To process the signal, the orthogonalization method creates a signal matrix A by concatenating K adjacent subcarrier data from at least two consecutive OFDM symbols into a matrix of create M*(N*k) matrix where k is an integer representing the number of consecutive training symbols used. For computation the matrix (M*(N*k) is transposed and the vector W of M complex coefficients is computed using the formula $W=(A^TA)^{-1}*A^T*d$. The vector d is concatenated from k symbols, i.e. is of dimension (N*k)*1.

A hand portable device that uses two to four antennas and the receive signal processing method described above to create an interference resistant communication system. Each received RF signal is converted to digital domain and further into frequency domain for signal processing as described above.

A hand portable device that uses dual-polarized antennas for creating signals for input to the signal processing as described above.

A hand portable device that uses the method described above only when necessary to receive data correctly. If a large number (P) of data packets are received correctly the receiver can save power by not using the processing described above. However, if data errors are detected then the receiver can use the method described above. The cost of using the method is larger power consumption due to large number of numerical operations that are required. The system may also actively manage the number of RF receiver chains depending on performance requirement, i.e. in good conditions a hand portable may turn some RF receiver chains off to save power if data is received correctly in the absence if interference.

For a fuller understanding of the nature and objects of the invention, reference should be made to the following detailed description

DETAILED DESCRIPTION OF THE INVENTION

This invention describes a cognitive radio signal processing where interference is mitigated using multiple frequency spatial projection to orthogonalize interference. The method is based on the well known least mean square (LMS) solution of $W=(A^TA)^{-1}*A^T*d$ that is computed from received multi antenna and multicarrier signals in a novel way.

In the formula $W=(A^TA)^{-1}*A^T*d$ the d is known signal (local reference) and A is measured samples from the receiver. The receiver divides the received signal into multiple blocks where each block consists of N adjacent carriers, N=4 to 32. A large number of subcarriers in an OFDM is divided into multiple blocks so that each block has typically 13 subcarriers, each approximately 12 kHz wide.

The system requires a multiple antenna receiver, for example 4 receive antennas that are placed in a circular or other beneficial arrangement. The received signal is 4-dimensional, each dimension represented by one of each antenna signal received. The digital baseband representation of each antenna signal is a complex number (x+iy), each receive chain having frequency locked down conversion stages to make sure that phases between RF receive chains are constants but not necessarily known to the receiver.

Matrix A is created by taking all the complex samples from the received training sequence and creating a matrix M×N, (M rows, N columns) where M is the number of receive antennas and N is the number of adjacent carriers that are used for calculating the projection. To create a matrix A that is useful typically two consecutive training symbols is needed and two or more matrices (A1 and A2) are created, i.e. one for both of the symbols. The two or more matrices (A1 and A2) can then be combined to create M*(N*k) matrix A where k is integer representing the number of consecutive training symbols used. The matrix A dimension is 4 rows, 26 columns when a 4 antenna system has two training symbols and 13 subcarriers is used per symbol for computing matrix A. For computation the matrix M*(N*k) is transposed and the vector W of M complex coefficients is computed using the formula $W=(A^T A)^{-1} * A^T * d$. The vector d is concatenated from k symbols, i.e. is of dimension (N*k)*1.

The output W consists of M complex numbers that are used to compute the projection, i.e. the received M antenna signals are multiplied by vector W. For multiplication the vector W is used for the "frequency block" of N subcarriers.

If the used OFDM or multicarrier system consists of a large number of carriers the system may use S=Nsubc/N blocks where Nsubc is the number of active subcarriers. Each block S is processed as described above. This allows independent cancellation of interference arriving from S*(M−1) sources.

Since certain changes may be made in the above described system and method for an interference mitigation method without departing from the scope of the invention herein involved, it is intended that all matter contained in the description thereof shall be interpreted as illustrative and not in a limiting sense.

What is claimed is:

1. An OFDM symbols cognitive radio receiver signal processing method where interference is mitigated using multiple frequency domain spatial projections to orthogonalize interference comprising:
    said OFDM symbols cognitive radio receiver receiving multiple receive signals that are each received using individual receive antennas;
    said OFDM symbols cognitive radio receiver transforming said each received signal using Fourier or Fast Fourier Transforming resulting in complex outputs that are subcarriers containing subcarrier data for each OFDM symbol;
    said OFDM symbols cognitive radio receiver processing said subcarrier data for each OFDM symbol by concatenating adjacent subcarrier data from groups of two or more consecutive OFDM symbols and then said OFDM symbols cognitive radio receiver creating a vector of multiple sub-band frequency domain spatial projections from said concatenated adjacent subcarrier data from groups of two or more consecutive OFDM symbols; and,
    said OFDM symbols cognitive radio receiver multiplying said multiple received antenna signals by said vector to orthogonalize interference.

2. The interference mitigation method of claim 1 wherein the individual receive antennas are dual-polarized antennas.

3. The interference mitigation method of claim 1 wherein the method is used only if a threshold number of OFDM symbols are not being correctly received.

4. A hand held portable receiving device using an OFDM symbols cognitive radio signal processing method where interference is mitigated by said hand held portable receiving device using multiple frequency domain spatial projections to orthogonalize interference comprising:
    said hand held portable receiving device receiving multiple receive signals that are each received using individual receive antennas;
    said hand held portable receiving device having a processor for transforming said each received signal using Fourier or Fast Fourier Transforming resulting in complex outputs that are subcarriers containing subcarrier data for each OFDM symbol;
    said hand held portable receiving device processor then processing said subcarrier data for each OFDM symbol by concatenating adjacent subcarrier data from groups of two or more consecutive OFDM symbols and then said hand held portable receiving device creating a vector of multiple sub-band frequency domain spatial projections from said concatenated adjacent subcarrier data from groups of two or more consecutive OFDM symbols; and,
    said hand held portable receiving device multiplying said multiple received antenna signals by said vector to orthogonalize interference.

5. The hand held portable receiving device of claim 4 wherein the individual receive antennas are dual-polarized antennas.

6. The hand held portable receiving device of claim 4 wherein said interference mitigation is used only if a threshold number of OFDM symbols are not being correctly received.

7. The interference mitigation method claim 1 wherein said OFDM symbols cognitive radio receiver processing of said two or more adjacent subcarrier data comprises:
    said OFDM symbols cognitive radio receiver creating a signal matrix A by concatenating k adjacent subcarrier data from two or more consecutive OFDM symbols where k is the number of consecutive OFDM symbols used into a M*(N*k) matrix A where M is the number of receive antennas and N is the number of adjacent subcarriers; and,
    said OFDM symbols cognitive radio receiver transposing said matrix and computing the vector W of M complex coefficients using the formula $W=(A^T A)^{-1} * A^T * d$ wherein the vector d is concatenated from k consecutive OFDM symbols such that the vector d is of dimension (N*k)*1.

8. The method of claim 4 wherein said hand held portable receiving device processing of said two or more adjacent subcarrier data comprises:
    said hand held portable receiving device processor creating a signal matrix A by concatenating k adjacent subcarrier data from two or more consecutive OFDM symbols where k is the number of consecutive OFDM symbols used into a M*(N*k) matrix A where M is the number of receive antennas and N is the number of adjacent subcarriers; and,
    said hand held portable receiving device processor transposing said matrix and computing the vector W of M complex coefficients using the formula $W=(A^T A)^{-1} * A^T * d$ wherein the vector d is concatenated from k consecutive OFDM symbols such that the vector d is of dimension (N*k)*1.

* * * * *